(12) United States Patent
Honda et al.

(10) Patent No.: US 7,455,702 B2
(45) Date of Patent: Nov. 25, 2008

(54) PRODUCTION METHOD OF LITHIUM SECONDARY BATTERY AND PRODUCTION DEVICE THEREFOR

(75) Inventors: Kazuyoshi Honda, Takatsuki (JP); Yoriko Takai, Toyonaka (JP); Sadayuki Okazaki, Katano (JP); Syuji Ito, Nara (JP); Junichi Inaba, Toyonaka (JP); Hiroshi Higuchi, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 421 days.

(21) Appl. No.: 10/488,142

(22) PCT Filed: Aug. 28, 2002

(86) PCT No.: PCT/JP02/08639

§ 371 (c)(1),
(2), (4) Date: Feb. 26, 2004

(87) PCT Pub. No.: WO03/021705

PCT Pub. Date: Mar. 13, 2003

(65) Prior Publication Data

US 2004/0205959 A1    Oct. 21, 2004

(30) Foreign Application Priority Data

Aug. 29, 2001    (JP)    ............................. 2001-259794

(51) Int. Cl.
*H01M 10/40*    (2006.01)

(52) U.S. Cl. ...................... 29/623.5; 429/305; 429/103; 429/322

(58) Field of Classification Search ................ 429/103, 429/305, 322; 29/623.5
See application file for complete search history.

(56) References Cited

U.S. PATENT DOCUMENTS

| 5,217,827 | A | * | 6/1993 | Fauteux et al. | ............... | 429/310 |
| 5,348,824 | A | * | 9/1994 | Duval | ............... | 429/307 |
| 5,411,818 | A | | 5/1995 | Barlow et al. | | |
| 5,705,292 | A | | 1/1998 | Yukita et al. | | |
| 5,772,934 | A | * | 6/1998 | MacFadden | ............... | 264/42 |
| 6,503,432 | B1 | | 1/2003 | Barton et al. | | |

FOREIGN PATENT DOCUMENTS

| EP | 0 145 489 A2 | 6/1985 |
| EP | 0 651 454 A | 5/1995 |
| JP | 02 162661 A | 6/1990 |
| JP | 8-203482 | 8/1996 |

(Continued)

*Primary Examiner*—Tracy Dove
(74) *Attorney, Agent, or Firm*—Hamre, Schumann, Mueller & Larson, P.C.

(57) ABSTRACT

A manufacturing method of the present invention includes ejecting a melt 61 of a solid electrolyte onto at least one electrode plate selected from a positive electrode plate 20 and a negative electrode plate 30, thereby depositing the melt 61 onto the at least one electrode plate, and compressing the positive electrode plate 20 and the negative electrode plate 30 while sandwiching the melt 61, thereby forming a layered body including the positive electrode plate 20, an electrolyte layer 62 including the solid electrolyte, and the negative electrode plate 30. In accordance with this manufacturing method, a thin lithium secondary battery having excellent characteristics can be manufactured in a highly productive manner.

6 Claims, 8 Drawing Sheets

FOREIGN PATENT DOCUMENTS

| | | |
|---|---|---|
| JP | 10-284130 | 10/1998 |
| JP | 2000-348774 | 12/2000 |
| JP | 2001-325993 | 11/2001 |
| JP | 2002 050400 A | 2/2002 |
| WO | WO 01/17051 A1 | 3/2001 |

\* cited by examiner

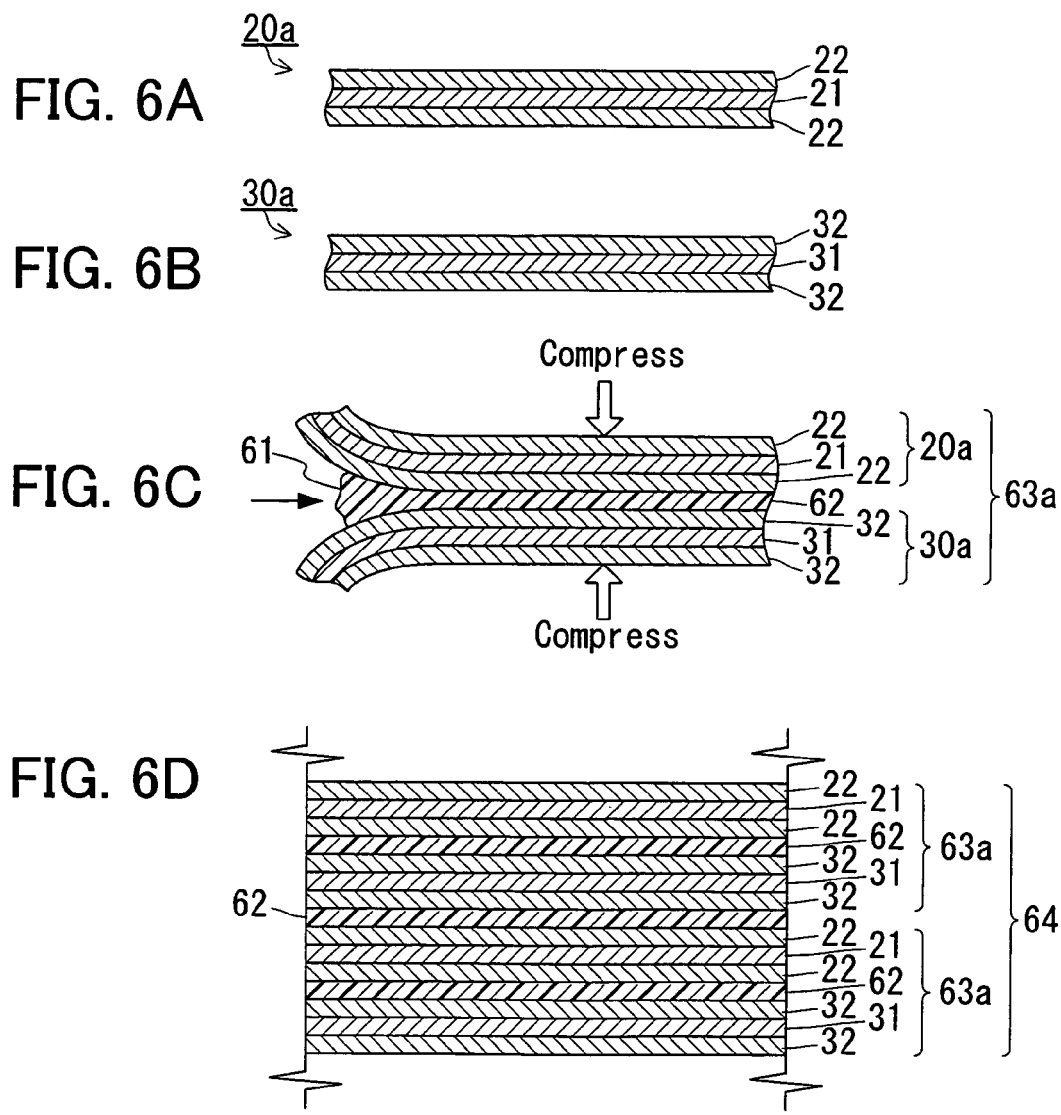

PRODUCTION METHOD OF LITHIUM SECONDARY BATTERY AND PRODUCTION DEVICE THEREFOR

TECHNICAL FIELD

The present invention relates to a method for manufacturing a lithium secondary battery and an apparatus for manufacturing the same.

BACKGROUND ART

A lithium secondary battery includes a solid electrolyte, and positive and negative electrodes that are arranged so as to sandwich the solid electrolyte. Accompanying the recent trend toward thinner lithium secondary batteries, it has become necessary to reduce the thickness of a solid electrolyte. As a method for reducing a solid electrolyte thickness, a deposition technique can be considered.

However, because of the complex composition of the solid electrolyte used for the lithium secondary batteries, a solid electrolyte with excellent characteristics cannot be formed easily by the deposition technique. Further, there has been a problem that the deposition technique cannot be carried out with sufficient productivity.

DISCLOSURE OF INVENTION

With the foregoing in mind, it is an object of the present invention to provide a method for manufacturing a thin lithium secondary battery with excellent characteristics in a highly productive manner, and an apparatus for manufacturing the same.

In order to achieve the above-mentioned object, a manufacturing method of the present invention is a method for manufacturing a lithium secondary battery including a positive electrode plate, a negative electrode plate, and a solid electrolyte arranged between the positive electrode plate and the negative electrode plate. The method includes (i) ejecting a melt of the solid electrolyte onto at least one electrode plate selected from the positive electrode plate and the negative electrode plate, thereby depositing the melt onto the at least one electrode plate, and (ii) compressing the positive electrode plate and the negative electrode plate while sandwiching the melt, thereby forming a layered body including the positive electrode plate, an electrolyte layer including the solid electrolyte, and the negative electrode plate. With this manufacturing method of the present invention, since a thin solid electrolyte layer having excellent characteristics can be formed in a highly productive manner, a thin lithium secondary battery having excellent characteristics can be manufactured in a highly productive manner.

In the above-described manufacturing method, the solid electrolyte may contain $Li_3PO_4$. In this case, the solid electrolyte may be $Li_3PO_4$, a solid electrolyte obtained by adding nitrogen to $Li_3PO_4$, or $Li_3PO_4$—$Li_2S$—$SiS_2$.

The above-described manufacturing method further may include after the (ii) compressing, (iii) layering the layered body by ejecting the melt of the solid electrolyte onto at least one surface of the layered body and then winding the layered body.

In the above-described manufacturing method, in the (ii) compressing, the layered body may be formed by compressing the positive electrode plate and the negative electrode plate while cooling them down. With this configuration, it is possible to manufacture a lithium secondary battery having particularly excellent characteristics.

In the above-described manufacturing method, the electrolyte layer may have a thickness ranging from 0.1 μm to 10 μm.

Further, a manufacturing apparatus of the present invention is an apparatus for manufacturing a lithium secondary battery including a positive electrode plate, a negative electrode plate, and a solid electrolyte arranged between the positive electrode plate and the negative electrode plate. The apparatus includes a spraying device for ejecting a melt of the solid electrolyte onto at least one electrode plate selected from the positive electrode plate and the negative electrode plate, and a compressing device for compressing the positive electrode plate and the negative electrode plate while sandwiching the melt.

In the above-described manufacturing apparatus, the compressing device may include two rollers.

BRIEF DESCRIPTION OF DRAWINGS

FIGS. 6A to 6D are sectional views showing a process flow of another example of the manufacturing method for manufacturing a lithium secondary battery according to the present invention.

BEST MODE FOR CARRYING OUT THE INVENTION

The following is a description of embodiments of the present invention, with reference to the accompanying drawings.

FIRST EMBODIMENT

Figure 1A:
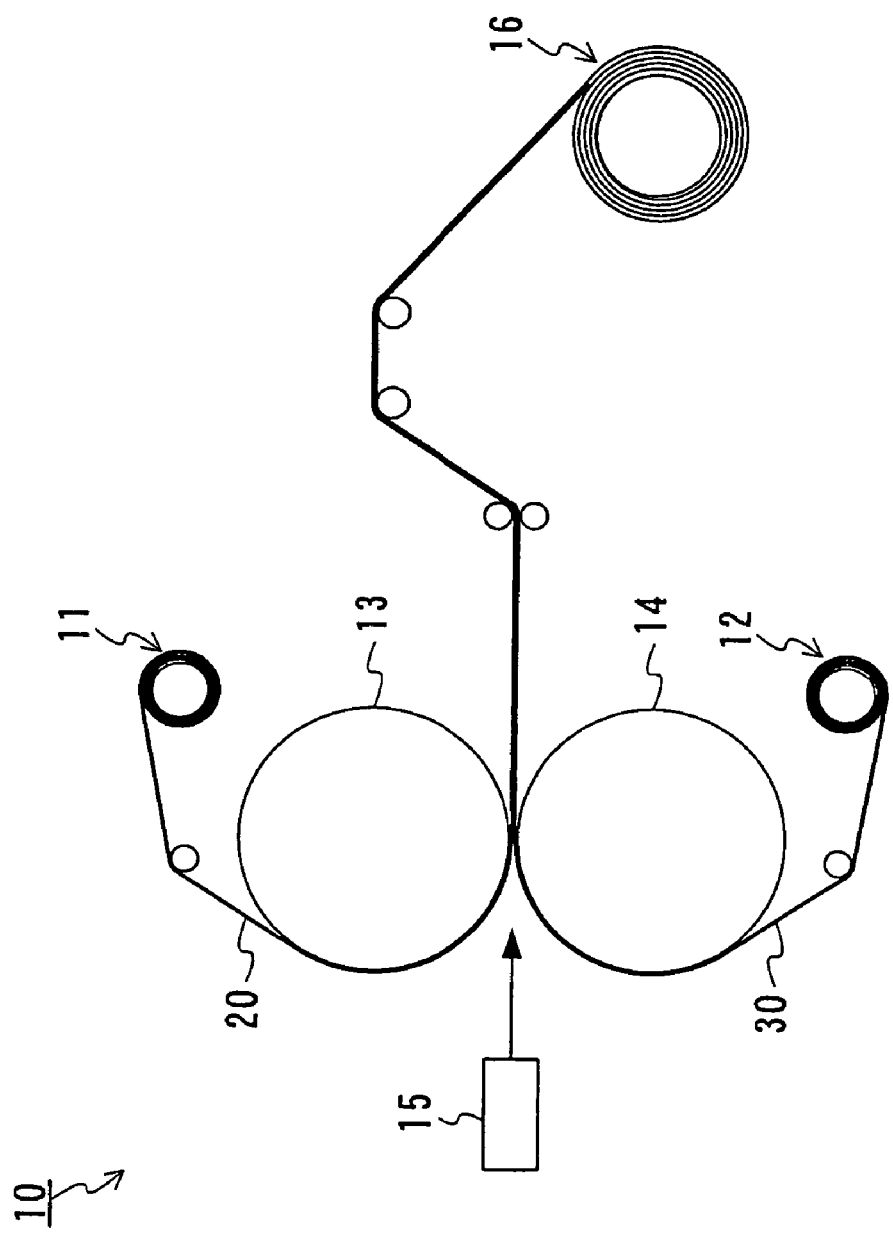
FIG. 1A is a schematic view showing a configuration of an example of a manufacturing apparatus for manufacturing a lithium secondary battery, according to the present invention. Also.

The first embodiment is directed to an example of a manufacturing apparatus for manufacturing a lithium secondary battery, according to the present invention. FIG. 1A schematically shows a configuration of a manufacturing apparatus 10 of the first embodiment.

Referring to FIG. 1A, the manufacturing apparatus 10 includes a feed roller 11 for sending out a positive electrode plate 20, a feed roller 12 for sending out a negative electrode plate 30, cooling rollers 13 and 14, a spraying device 15, and a take-up roller 16. The positive electrode plate 20 and the negative electrode plate 30 are wound around the feed roller 11 and the feed roller 12, respectively.

The spraying device 15 ejects a melt of a solid electrolyte toward the positive electrode plate 20 and the negative electrode plate 30. Incidentally, although FIG. 1A illustrates the case of ejecting the melt toward both of the positive electrode plate 20 and the negative electrode plate 30, the melt may be ejected toward only one of them.

The rollers 13 and 14 function as devices for compressing the positive electrode plate 20 and the negative electrode plate 30, to which the melt of the solid electrolyte has been ejected, while sandwiching the melt. The cooling rollers 13 and 14 also may have a function of cooling down the ejected melt of the solid electrolyte rapidly via the positive electrode plate 20 and the negative electrode plate 30. The take-up roller 16 takes up a layered body of the positive electrode plate, a solid electrolyte layer and the negative electrode plate.

Figure 1B:
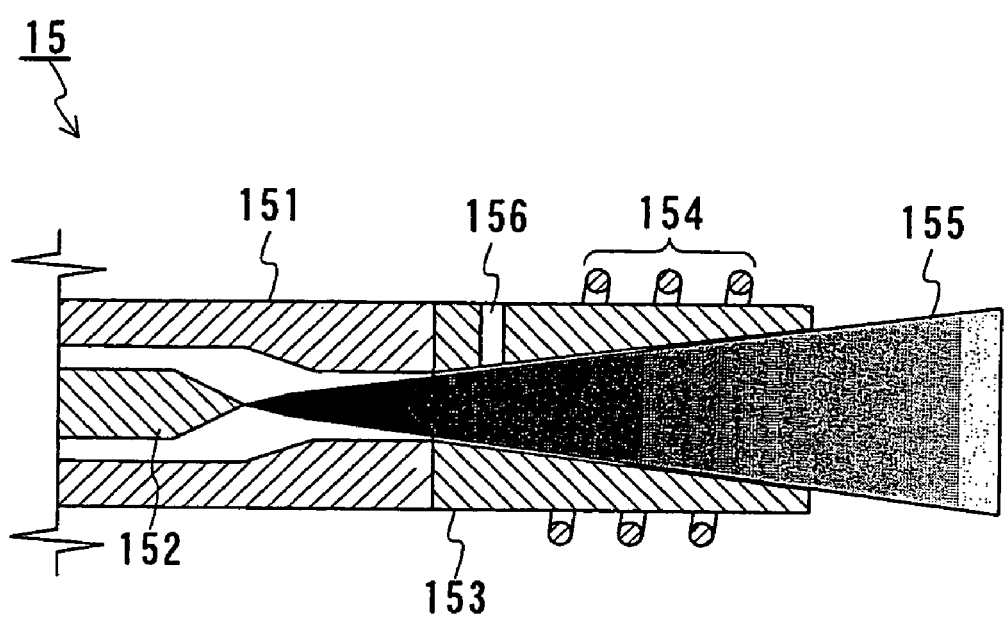
FIG. 1B is a sectional view schematically showing a main portion of an example of a spraying device used in the manufacturing apparatus of FIG. 1A.

FIG. 1B shows the configuration of a main portion of an example of the spraying device 15. The spraying device 15 includes an anode 151, a cathode 152, a nozzle 153 and a RF induction coil 154. A material gas of plasma is allowed to flow between the anode 151 and the cathode 152, and a high-temperature plasma 155 is generated by the RF induction coil 154. This plasma 155 is discharged from the tip of the nozzle 153. A lateral side of the nozzle 153 is provided with a through hole 156, through which solid electrolyte powder is supplied. This powder is dissolved in the plasma 155, and its melt is ejected toward the electrode plates. Incidentally, the plasma spraying device illustrated in FIG. 1B is merely an example, and spraying devices other than the plasma spraying device may be used.

A method for manufacturing a lithium secondary battery using the manufacturing apparatus 10 will be described in the second embodiment.

Figure 2:
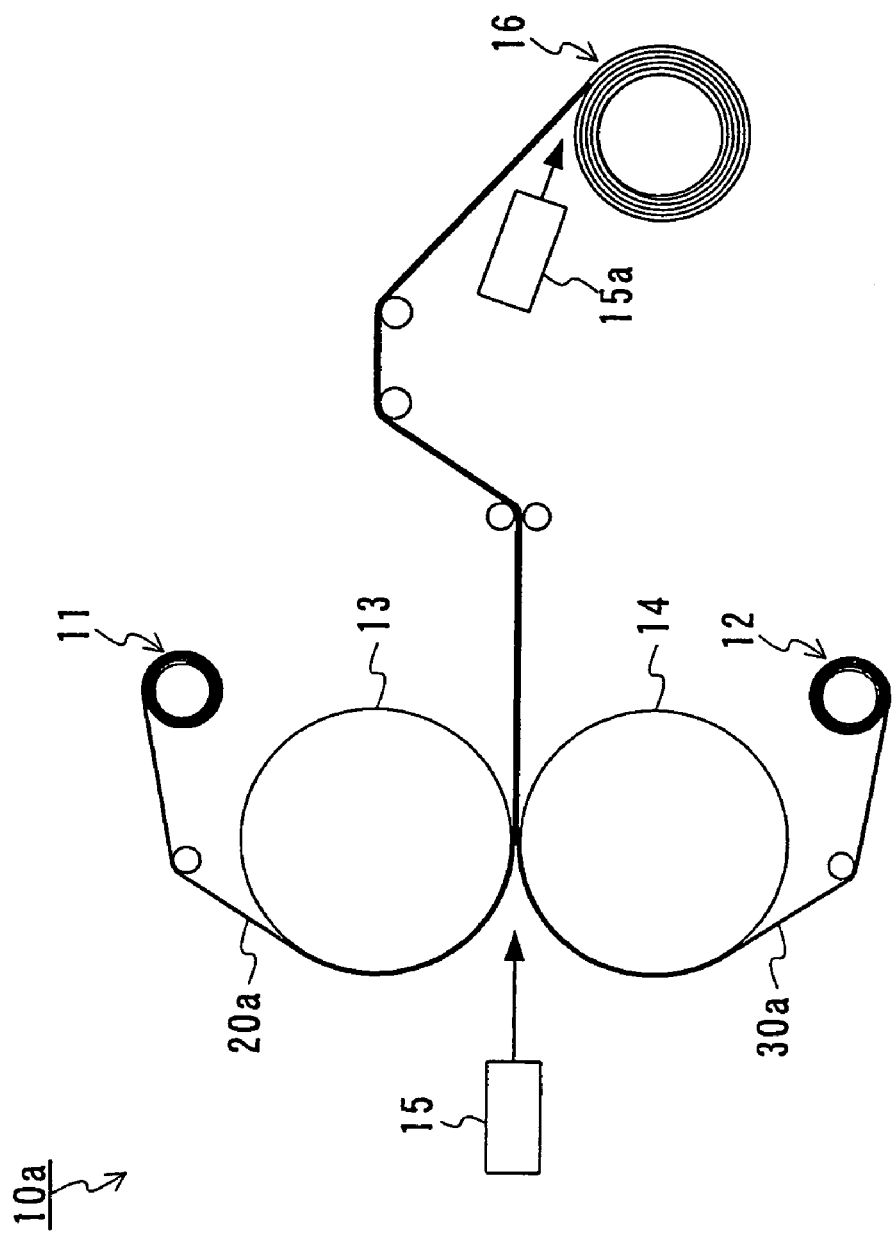
FIG. 2 is a schematic view showing a configuration of another example of the manufacturing apparatus for manufacturing a lithium secondary battery according to the present invention.

The manufacturing apparatus of the present invention further may include a second spraying device, a positive electrode plate forming device or a negative electrode plate forming device. FIG. 2 illustrates a manufacturing apparatus 10a including a second spraying device 15a. Further, FIG. 3 illustrates a positive electrode plate forming device 40, and FIG. 4 illustrates a negative electrode plate forming device 50.

Referring to FIG. 2, the manufacturing apparatus 10a is different from the manufacturing apparatus 10 in that the spraying device 15a is provided between the take-up roller 16 and the cooling rollers 13 and 14. The spraying device 15a also ejects the melt of the solid electrolyte as the spraying device 15 and may be the same as the spraying device 15. By using the manufacturing apparatus 10a, it is possible to manufacture a lithium secondary battery in which a plurality of the positive electrode plates, the solid electrolytes and the negative electrode plates are layered. A method for manufacturing a lithium secondary battery using the manufacturing apparatus 10a will be described in the second embodiment.

Figure 3:
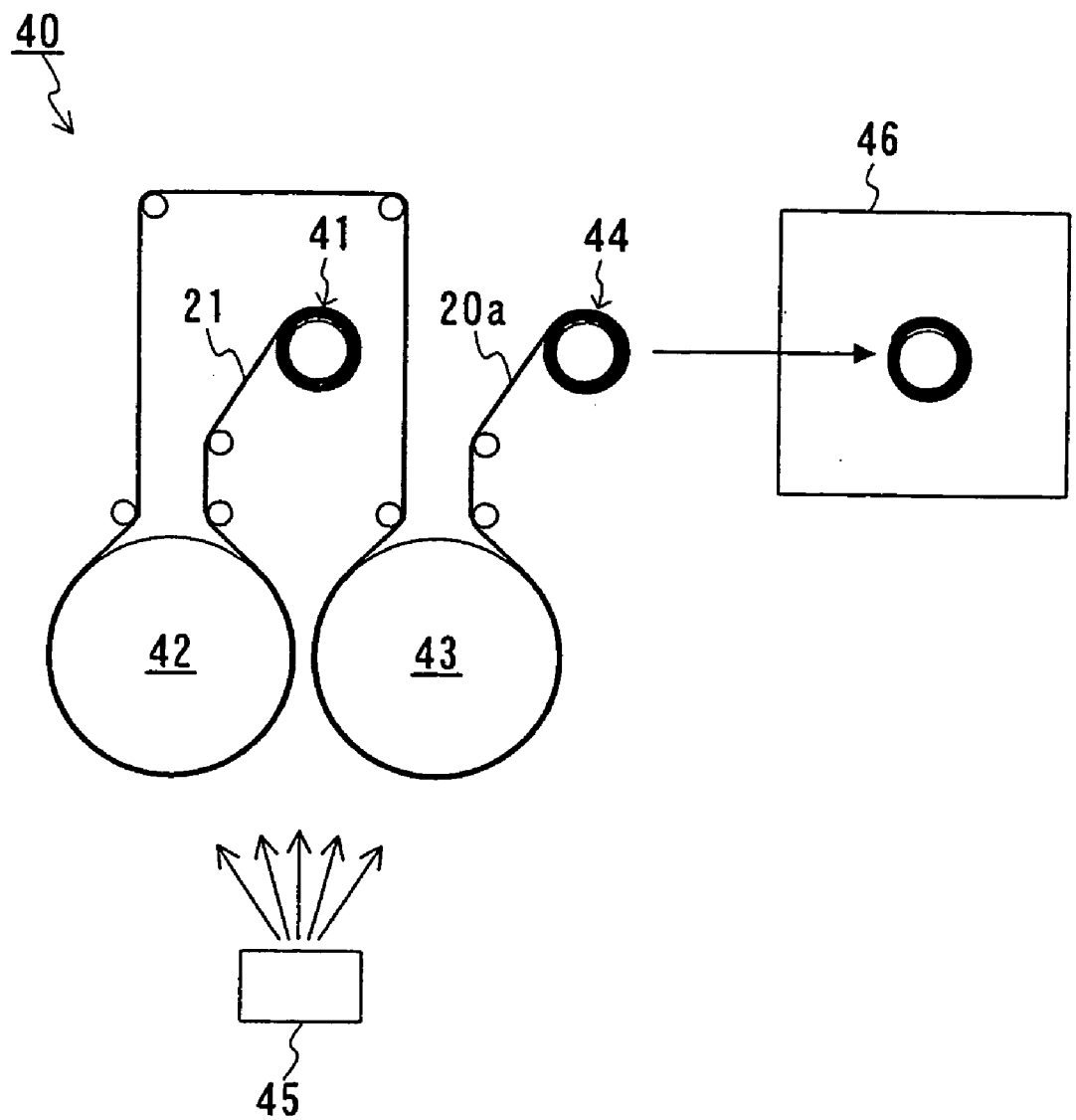
FIG. 3 is a schematic view showing a partial configuration of yet another example of the manufacturing apparatus for manufacturing a lithium secondary battery according to the present invention.
Figure 4:
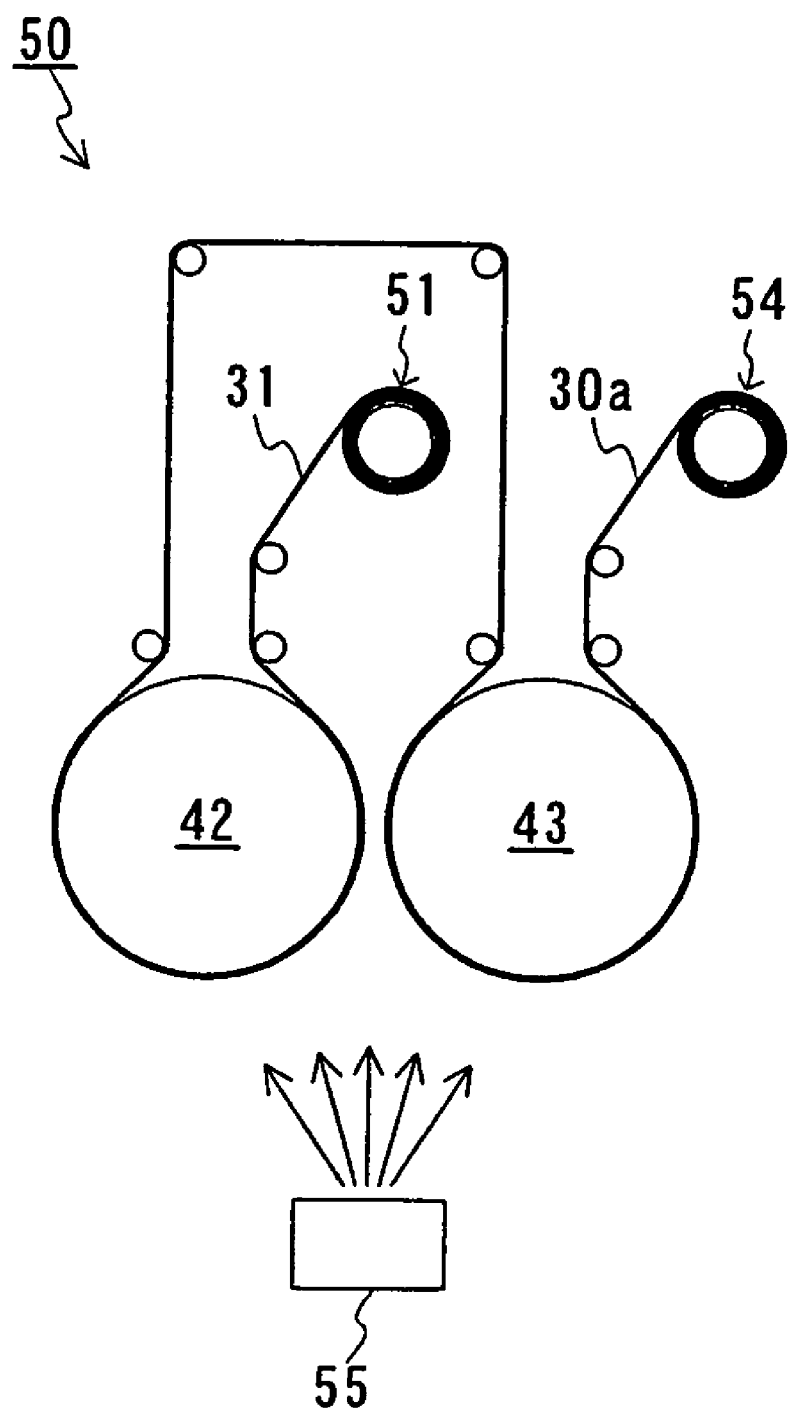
FIG. 4 is a schematic view showing a partial configuration of yet another example of the manufacturing apparatus for manufacturing a lithium secondary battery according to the present invention.

Referring to FIG. 3, the positive electrode plate forming device 40 includes a feed roller 41, rollers 42 and 43, a take-up roller 44 and a deposition device 45. The feed roller 41 sends out a collector 21 of the positive electrode. The deposition device 45 deposits an active material for positive electrode onto the collector 21. Incidentally, although FIG. 3 illustrates the case of forming an active material layer on both surfaces of the collector 21 using the rollers 42 and 43, it also may be possible to form the active material layer only on one surface of the collector 21. Further, the active material layer also may be applied to the collector 21 by an applicator.

The positive electrode plate 20a obtained by forming the active material layer on both surfaces of the collector 21 is taken up by the take-up roller 44. It is preferable that the positive electrode plate 20a taken up by the take-up roller 44 is annealed in an annealing furnace 46. The manufacturing apparatus 10 of the present invention may include the positive electrode plate forming device 40 in which the annealing furnace 46 is integrated, instead of the feed roller 11.

Referring to FIG. 4, the negative electrode plate forming device 50 includes a feed roller 51, rollers 52 and 53, a take-up roller 54 and a deposition device 55. The feed roller 51 sends out a collector 31 of the negative electrode. The deposition device 55 deposits an active material for negative electrode onto the collector 31. Incidentally, although FIG. 4 illustrates the case of forming an active material layer on both surfaces of the collector 31 using the rollers 52 and 53, it also may be possible to form the active material layer only on one surface of the collector 31. Further, the active material layer also may be applied to the collector 31 by an applicator.

The negative electrode 30a obtained by forming the active material layer on both surfaces of the collector 31 is taken up by the take-up roller 54. The manufacturing apparatus 10 of the present invention may include the negative electrode plate forming device 50 instead of the feed roller 12.

SECOND EMBODIMENT

The second embodiment is directed to an example of a manufacturing method for manufacturing a lithium secondary battery, according to the present invention. Although the second embodiment will discuss the case of using the manufacturing apparatus described in the first embodiment, the manufacturing method of the present invention is not limited to this. FIGS. 5A to 5D show a manufacturing process in the second embodiment.

Figure 5A:
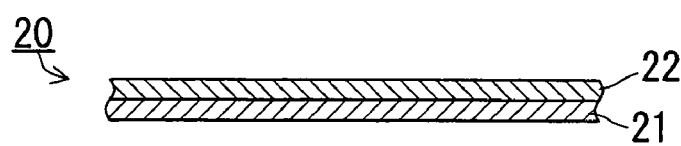
FIGS. 5A to 5D are sectional views showing a process flow of an example of a manufacturing method for manufacturing a lithium secondary battery according to the present invention.
Figure 5B:
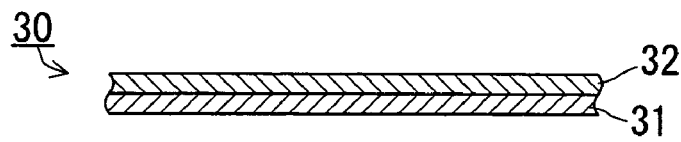

First, a positive electrode plate 20 as shown in FIG. 5A and a negative electrode plate 30 as shown in FIG. 5B are prepared. The positive electrode plate 20 includes a collector 21 and an active material layer 22 formed on one surface of the collector 21. It should be noted that the active material layer 22 also may be formed on both surfaces of the collector 21. The collector 21 and the active material layer 22 can be those generally used for a lithium secondary battery. For example, the collector 21 can be a collector formed of an electrically conductive material, more specifically, platinum, platinum/palladium, gold, silver, aluminum, copper, nickel, stainless steel, ITO (indium-tin oxide film), carbon materials or the like. Further, the active material layer 22 can be a layer containing, for example, $LiCoO_2$ or $LiNiO_2$. The positive electrode plate 20 can be formed by applying or depositing a material of the active material layer 22 onto the collector 21.

The negative electrode plate 30 includes a collector 31 and an active material layer 32 formed on one surface of the collector 31. It should be noted that the active material layer 22 also may be formed on both surfaces of the collector 21. The collector 31 and the active material layer 32 can be those generally used for a lithium secondary battery. For example, the collector 31 can be similar to the collector 21. Also, the active material layer 32 can be a layer containing, for example, Li and/or C (carbon). More specifically, a layer containing Li, a graphite-based material or a difficult-to-graphitize carbon material as the active material can be used as the active material layer 32. The negative electrode plate 30 can be formed by applying or depositing a material of the active material layer 32 onto the collector 31.

Figure 5C:
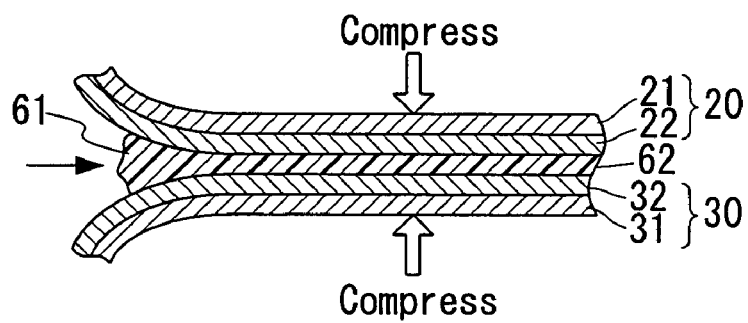

Next, a melt of a solid electrolyte is ejected toward at least one electrode plate selected from the positive electrode plate 20 and the negative electrode plate 30, thereby depositing the melt of the solid electrolyte onto the at least one electrode plate (Process (i)). FIG. 5C illustrates an example of this Process (i). In the example illustrated in FIG. 5C, a melt 61 of the solid electrolyte is ejected toward and deposited onto both of the positive electrode plate 20 and the negative electrode plate 30. The melt 61 is deposited onto the side provided with the active material layer in the positive electrode plate 20 and the negative electrode plate 30.

The solid electrolyte serving as a material of the melt 61 can be a solid electrolyte that is capable of constituting a lithium secondary battery and being deposited onto the electrode plate by spraying. More specifically, the solid electrolyte to be the melt 61 can be a material having an electron conductivity so small as to be negligible and ion conductivity. Here, it is preferable to use a solid electrolyte having an excellent lithium ion conductivity because lithium ions are mobile ions. In particular, a solid electrolyte containing $Li_3PO_4$ is preferable, and for example, $Li_3PO_4$ or a solid electrolyte obtained by adding nitrogen to $Li_3PO_4$ (or by substituting a part of elements in $Li_3PO_4$ with nitrogen, LIPON: represented by a composition $Li_{2.9}PO_{3.3}N_{0.36}$) is effective. Similarly, a sulfide solid electrolyte such as $Li_2S$—$SiS_2$, $Li_2S$—$P_2S_5$ or $Li_2S$—$B_2S_3$ also is effective. Furthermore, a solid electrolyte obtained by doping these solid electrolytes with lithium halide such as LiI or oxyate containing lithium such as $Li_3PO_4$ also is effective. For example, $Li_3PO_4$—$Li_2S$—$SiS_2$, which is a mixture of $Li_3PO_4$, $Li_2S$ and $SiS_2$, is effective. These solid electrolytes can be sprayed using a general plasma spraying device or the like.

Figure 5D:
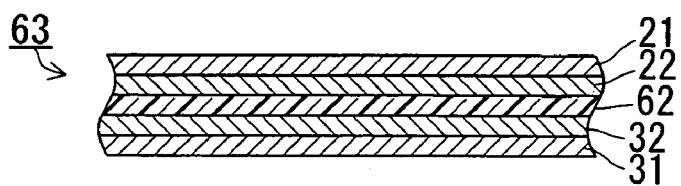

After the melt 61 is deposited, the positive electrode plate 20 and the negative electrode plate 30 are compressed while sandwiching the melt 61 as shown in FIG. 5C, thereby forming a layered body 63 including the positive electrode plate 20, a solid electrolyte layer 62 and the negative electrode plate 30 as shown in FIG. 5D (Process (ii)). The solid electrolyte layer 62 is formed by solidification of the melt 61. At this time, the positive electrode plate 20 and the negative electrode plate 30 are compressed so as to form the layered body of the collector 21/the active material layer 22/the solid electrolyte layer 62/the active material layer 32/the collector 31. The solid electrolyte layer 62 to be formed has a thickness of about 0.1 μm to 10 μm, for example. This process can be carried out by the cooling rollers 13 and 14 shown in FIG. 1. At this time, it is preferable that the cooling rollers 13 and 14 are used to compress the melt 61 while cooling it down via the positive electrode plate 20 and the negative electrode plate 30. By cooling down the melt 61 rapidly, it is possible to form the solid electrolyte layer 62 with excellent crystallinity.

The obtained layered body 63 is taken up by the take-up roller 16. Thereafter, the layered body 63 is cut into a predetermined size and sealed into a case together with a nonaqueous electrolytic solution, followed by lead welding etc., thereby obtaining a lithium secondary battery. This process can be carried out by a general method.

In this way, a lithium secondary battery can be manufactured. In the manufacturing method of the second embodiment, since the solid electrolyte layer is formed by spraying, a thin solid electrolyte layer can be formed in a highly productive manner. Moreover, since the formation of the solid electrolyte layer by spraying makes it easier to control the composition of the solid electrolyte layer, it is possible to manufacture a lithium secondary battery having excellent characteristics.

THIRD EMBODIMENT

The third embodiment is directed to another example of the manufacturing method for manufacturing a lithium secondary battery, according to the present invention. Although the third embodiment will discuss the case of using the manufacturing apparatus 10a described in the first embodiment, the manufacturing method of the present invention is not limited to this. FIGS. 6A to 6D show a manufacturing process in the third embodiment.

First, a positive electrode plate 20a as shown in FIG. 6A and a negative electrode plate 30a as shown in FIG. 6B are prepared.

The positive electrode plate 20a includes a collector 21 and active material layers 22 formed on both surfaces of the collector 21. The collector 21 and the active material layers 22 can be those described in the second embodiment. The positive electrode plate 20a can be formed by applying or depositing a material of the active material layers 22 onto the collector 21. More specifically, it can be formed using the positive electrode plate forming device 40 shown in FIG. 3.

The negative electrode plate 30a includes a collector 31 and active material layers 32 formed on both surfaces of the collector 31. The collector 31 and the active material layers 32 can be those described in the second embodiment. The negative electrode plate 30a can be formed by applying or depositing a material of the active material layers 32 onto the collector 31. More specifically, it can be formed using the negative electrode plate forming device 50 shown in FIG. 4.

Next, a melt of a solid electrolyte is ejected toward at least one electrode plate selected from the positive electrode plate 20a and the negative electrode plate 30a, thereby depositing the solid electrolyte onto the at least one electrode plate (Process (i)). FIG. 6C illustrates an example of this Process (i). In the example illustrated in FIG. 6C, a melt 61 is ejected toward and deposited onto both of the positive electrode plate 20a and the negative electrode plate 30a. The melt 61 can be a melt described in the second embodiment.

Thereafter, the positive electrode plate 20a and the negative electrode plate 30a are compressed while sandwiching the melt 61, thereby forming a layered body 63a including the positive electrode plate 20a, a solid electrolyte layer 62 and the negative electrode plate 30a as shown in FIG. 6C (Process (ii)). This process is similar to that described in the second embodiment.

Then, after the melt 61 is ejected toward at least one surface of the layered body 63a, the layered body 63a is wound by the take-up roller 16, thereby layering the layered body 63a. In this way, a layered body 64 in which a plurality of the layered bodies 63a are layered with the solid electrolyte layers 62 sandwiched therebetween is obtained as shown in FIG. 6D. The layered body 64 can be formed using the manufacturing apparatus 10a. Thereafter, the layered body 64 is cut into a predetermined size and sealed into a case together with a nonaqueous electrolytic solution, followed by lead welding etc., thereby obtaining a lithium secondary battery. This process can be carried out by any suitable method.

Figure 7:
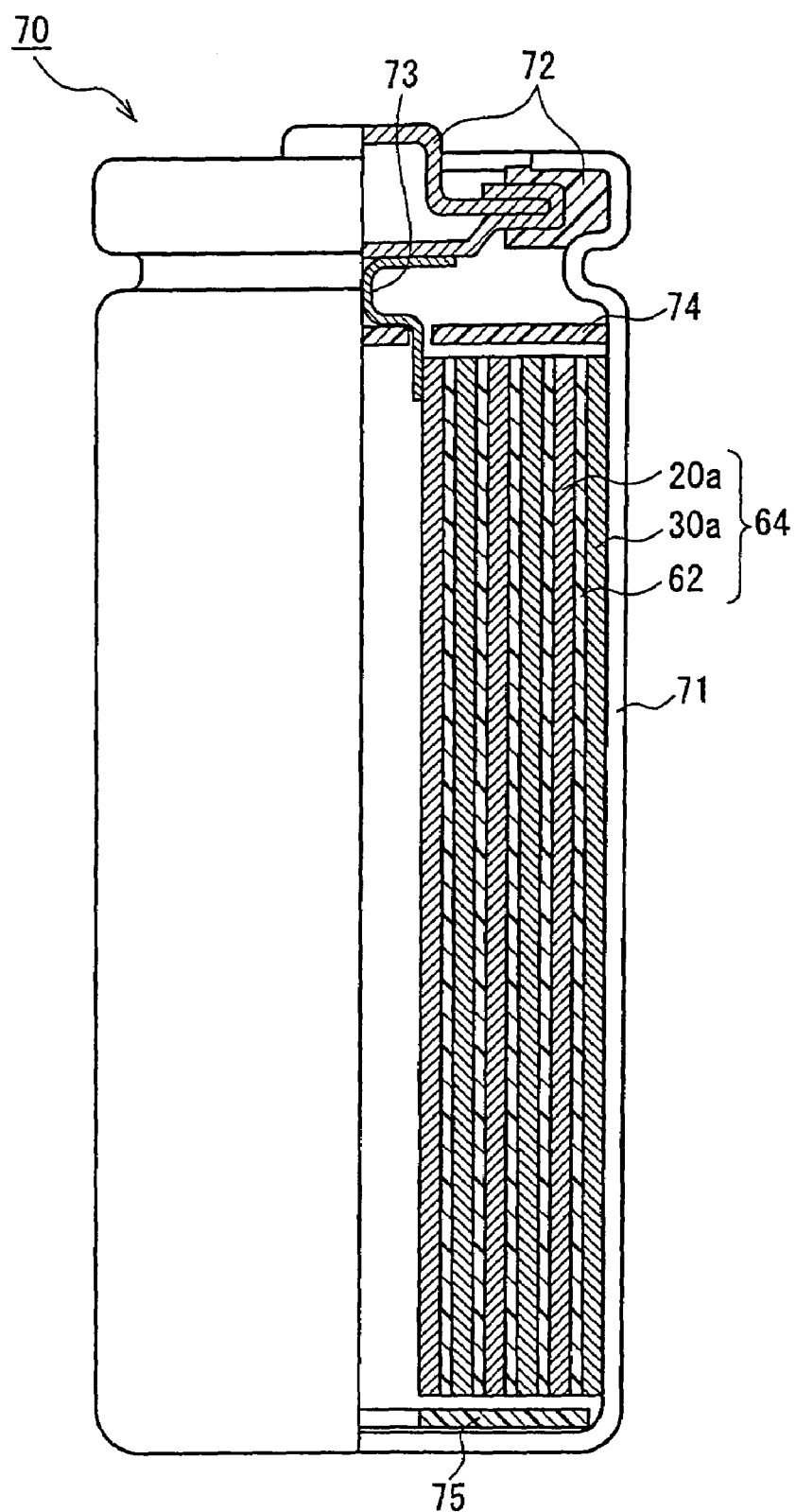
FIG. 7 is a partially exploded sectional view showing an example of a lithium secondary battery to be manufactured according to the manufacturing method of the present invention.

FIG. 7 is a sectional view showing an example of a lithium secondary battery manufactured by the manufacturing method of the present invention. A lithium secondary battery 70 shown in FIG. 7 includes a case 71, a seal 72, the layered body 64, a lead 73 and insulating plates 74 and 75. The configuration of the lithium secondary battery 70 is similar to that of general lithium secondary batteries, and members used in general lithium secondary batteries can be applied to parts other than the layered body 64.

The case 71 is made of metal and functions as a negative electrode terminal. The case 71 is sealed by the seal 72. The seal 72 functions as a positive electrode terminal. An electrolytic solution (not shown) is sealed in the case 71.

The layered body 64 includes the positive electrode plate 20*a*, the solid electrolyte layer 62 and the negative electrode plate 30*a*. The positive electrode plate 20*a* is connected to the seal 72 by the lead 73. The insulating plates 74 and 75 prevent a short circuit between the negative electrode plate 30*a* and the seal 72 and that between the positive electrode plate 20*a* and the case 71.

It should be noted that the lithium secondary battery illustrated in FIG. 7 is an example of a battery manufactured by the manufacturing method of the present invention, and the manufacturing method of the present invention can be utilized for various other forms of battery manufacturing.

The invention may be embodied in other specific forms without departing from the spirit or essential characteristics thereof The embodiments disclosed in this application are to be considered in all respects as illustrative and not restrictive. The scope of the invention is indicated by the appended claims rather than by the foregoing description, and all changes that come within the meaning and range of equivalency of the claims are intended to be embraced therein.

INDUSTRIAL APPLICABILITY

As described above, with a method for manufacturing a lithium secondary battery according to the present invention, a thin lithium secondary battery with excellent characteristics can be manufactured in a highly productive manner. Further, with a manufacturing apparatus according to the present invention, it is easy to carry out the manufacturing method of the present invention.

The invention claimed is:

1. A method for manufacturing a lithium secondary battery comprising a positive electrode plate, a negative electrode plate, and a solid electrolyte arranged between the positive electrode plate and the negative electrode plate; the method comprising:
   (i) spraying a melt of the solid electrolyte from a sprayer onto at least one electrode plate selected from the positive electrode plate and the negative electrode plate, thereby depositing a sprayed layer of the melt onto the at least one electrode plate; and
   (ii) compressing the positive electrode plate and the negative electrode plate while sandwiching the melt, thereby forming a layered body comprising the positive electrode plate, an electrolyte layer comprising the solid electrolyte, and the negative electrode plate.

2. The method according to claim 1, wherein the solid electrolyte comprises $Li_3PO_4$.

3. The method according to claim 1, wherein the solid electrolyte is $Li_3PO_4$, a solid electrolyte obtained by adding nitrogen to $Li_3PO_4$, or $Li_3PO_4$—$Li_2S$—$SiS_2$:

4. The method according to claim 1, further comprising after the (ii) compressing,
   (iii) layering the layered body by spraying the melt of the solid electrolyte onto at least one surface of the layered body and then winding the layered body.

5. The method according to claim 1, wherein in the (ii) compressing, the layered body is formed by compressing the positive electrode plate and the negative electrode plate while cooling them down.

6. The method according to claim 1. wherein the electrolyte layer has a thickness ranging from 0.1 μm to 10 μm.

* * * * *